(12) United States Patent
Slobodin (10) Patent No.: US 7,408,527 B2
(45) Date of Patent: *Aug. 5, 2008

(54) LIGHT EMITTING DEVICE DRIVING METHOD AND PROJECTION APPARATUS SO EQUIPPED

(75) Inventor: David E. Slobodin, Lake Oswego, OR (US)

(73) Assignee: Infocus Corporation, Wilsonville, OR (US)

( * ) Notice: Subject to any disclaimer, the term of this patent is extended or adjusted under 35 U.S.C. 154(b) by 726 days.

This patent is subject to a terminal disclaimer.

(21) Appl. No.: 10/835,672

(22) Filed: Apr. 30, 2004

(65) Prior Publication Data

US 2005/0243223 A1 Nov. 3, 2005

(51) Int. Cl.
*G09G 3/00* (2006.01)
*H04N 5/74* (2006.01)
(52) U.S. Cl. ............... 345/32; 345/82; 345/83; 345/204; 345/690; 345/692; 349/8; 348/744; 348/758
(58) Field of Classification Search ........... 345/204, 345/609, 692, 32, 82, 83; 348/744, 758, 348/759, E9.025, E9.027; 353/30, 31, 94; 349/8

See application file for complete search history.

(56) References Cited

U.S. PATENT DOCUMENTS

| | | |
|---|---|---|
| 4,851,818 A | 7/1989 | Brown et al. |
| 5,912,568 A | 6/1999 | Kiley |
| 6,038,021 A | 3/2000 | Piso et al. |
| 6,144,352 A | 11/2000 | Matsuda et al. |
| 6,208,073 B1 | 3/2001 | Wng et al. |
| 6,232,963 B1 | 5/2001 | Tew |
| 6,377,236 B1 | 4/2002 | Karamoto |
| 6,400,099 B1 | 6/2002 | Walker |
| 6,490,466 B1 | 12/2002 | Fein et al. |
| 6,571,113 B1 | 5/2003 | Fein et al. |
| 6,584,217 B1 | 6/2003 | Lawless et al. |
| 6,621,235 B2 | 9/2003 | Chang |
| 6,626,829 B1 | 9/2003 | Skaggs |
| 6,628,252 B2 | 9/2003 | Hoshino et al. |
| 6,738,649 B2 | 5/2004 | Suzuki |
| 6,748,180 B2 | 6/2004 | Feng |
| 6,777,883 B2 | 8/2004 | Mukherjee |
| 6,825,619 B2 | 11/2004 | Norris |
| 6,844,760 B2 | 1/2005 | Koharagi et al. |
| 6,856,765 B2 | 2/2005 | Okubo |
| 6,870,325 B2 | 3/2005 | Bushell et al. |
| 6,873,203 B1 | 3/2005 | Latham, II et al. |
| 7,052,138 B2 * | 5/2006 | Matsui .................. 353/31 |
| 7,088,321 B1 * | 8/2006 | Parker .................. 345/83 |

FOREIGN PATENT DOCUMENTS

| | | |
|---|---|---|
| EP | 1395064 | 3/2004 |
| GB | 2388993 | 11/2003 |
| WO | WO 02/080136 | * 10/2002 |
| WO | WO 2004059398 | 7/2004 |

* cited by examiner

*Primary Examiner*—My-Chau T Tran
(74) *Attorney, Agent, or Firm*—Schwabe Williamson & Wyatt (57) ABSTRACT

A projection system is provided with a controller equipped to drive light emitting devices of a light source of the projection system in a manner that enhances the operational life of the light emitting devices, the ability to provide peak white, and/or finer gray scale.

27 Claims, 4 Drawing Sheets

LIGHT EMITTING DEVICE DRIVING METHOD AND PROJECTION APPARATUS SO EQUIPPED

BACKGROUND

The present invention is related to the field of image projection.

A number of projection systems designed to render images, or more specifically, an image frame, by successively turning on and off selected ones of a number of light emitting devices have been proposed. Typically, each of the light emitting devices emits light in a primary color, e.g. red, green or blue. Typically, each of the light emitting devices is driven in accordance with its drive current design point, which is often selected to enable the light emitting device to have a reasonable chance of having a reasonably lengthy operational life.

Additionally, many of these projection systems employ light valves to control the color of each pixel of the image frame being rendered. A light valve e.g. may be a micro-mirror device, (for example DLP® device from Texas Instruments, Dallas, Tex.) and the color of a pixel may be controlled by controlling the on or off state of one or more micro-mirrors of the micro-mirror device through pulse width modulation of the micro-mirror device in synchronization with colored illumination light. Due to the responsiveness (response time) limits of some of the micro-mirrors (in the light valves), many of these projection systems have difficulty effectively imaging dark scenes, where discernment between the lowest gray levels are desired. An example is night scenes in a movie. Typically, temporal and/or spatial dithering is required. Temporal dithering refers to the effectuating of a color (and grayscale) effect through color controls that span different frame periods, whereas spatial dithering refers to the effectuating of a color (and grayscale) effect through color controls that span different pixels. Practice of either or both of these dithering techniques adds to operational complexity and cost (since a high compute power image processing ASIC is required to implement spatial and/or temporal dithering). In addition, these dithering techniques result in image artifacts: the appearance of noise or "snow" or lack of image detail in darker images and blurring of moving objects.

Another problem suffered by non-CRT projection systems is their inability to provide "peak white" to a small area of an image frame like CRT displays can.

BRIEF DESCRIPTION OF THE DRAWINGS

Embodiments of the present invention will be described by way of the accompanying drawings in which like references denote similar elements, and in which.

DETAILED DESCRIPTION OF EMBODIMENTS OF THE INVENTION

Embodiments of the present invention include but are not limited to methods for driving light emitting devices of a light source of a projection system, and projection systems incorporated with logic to practice the methods.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
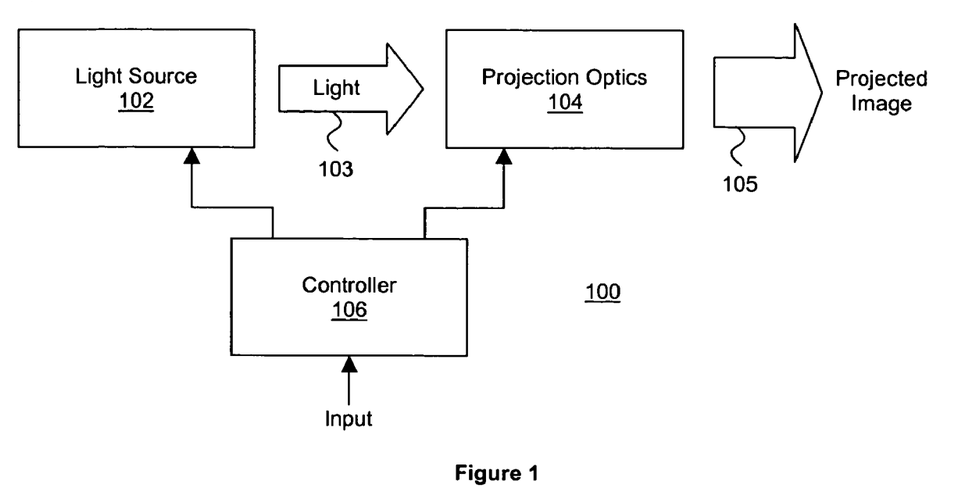
FIG. 1 is a block diagram illustrating a number of function blocks of a projection system, in accordance with one embodiment.

Referring now to FIG. 1 wherein a block diagram illustrating a number of function blocks of a projection system, in accordance with one embodiment, is shown. As illustrated, projection system 100 includes light source 102 and projection optics 104, optically coupled to each other. That is, light source 102 optically cooperates with projection optics 104, by providing light, to jointly effectuate rendering of desired images, which may be image frames of a video.

For the purpose of this description, a still image may be considered as a degenerate or special video where there is only one frame. Accordingly, both still image and video terminologies may be used in the description to follow, and they are not to be construed to limit the present invention to the rendering of one or the other. Further, a frame is typically comprised of a number of lines of pixels, which are rendered by controlling provision of light of selected colors in a time period, referred to as a frame period. The colors may be primary colors, and may be sequentially provided in portions of the frame period, also referred to as a sub-period.

As will be described in more detail below, in various embodiments, light source 102 may include a number of light emitting devices. More specifically, in various embodiments, the light emitting devices may be primary color light emitting devices designed to output light in corresponding primary colors. In particular, in various embodiments, the light emitting devices may be light emitting diodes (LED).

Further, in various embodiments, projection optics 104 may include a light valve. More specifically, in various embodiments, the light value may be a micro-mirror device having a number of micro-mirrors to facilitate control of the colors of the various pixels of an image frame being rendered.

For the embodiment of FIG. 1, projection system 100 also includes controller 106, which is electrically coupled to light source 102 and projection optics 104. Controller 106 may receive e.g. a video signal as input, and control light source 102 and projection optics 104 accordingly, to effectuate rendering of the image frames of the video signal.

As will be described in more detail below, controller 105 drives the light emitting devices of light source 102 in a selected or derived one of a number of advantageous driving schemes, and optionally, controls a light valve of projection optics 104 in a complementary manner. Resultantly, light emitting devices of light source 102 may have the desired longer operational life, and yet, projection system 100 may also render an image frame with improved gray levels and/or improved peak white.

Figure 2:
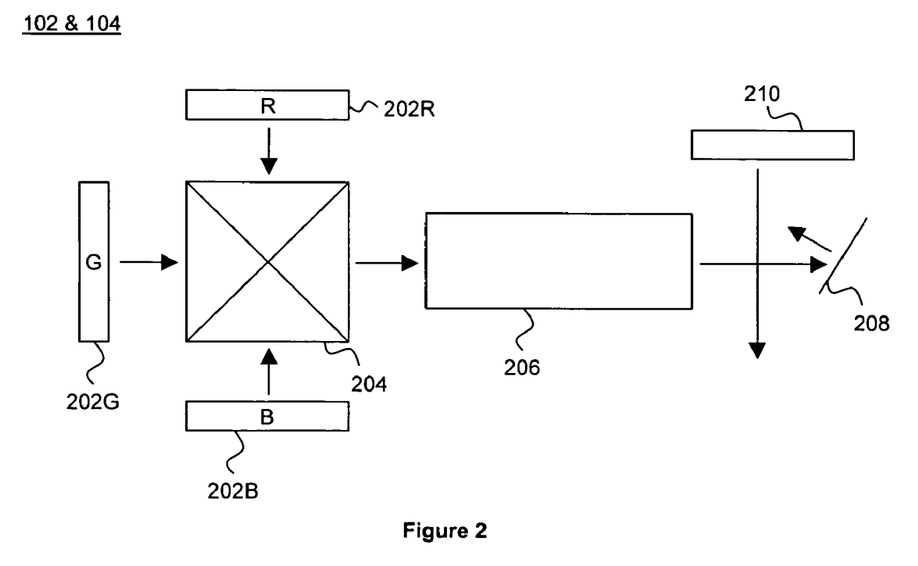
FIG. 2 illustrates the light source and the projection optics in further details, in accordance with one embodiment of the present invention.

FIG. 2 illustrates the light source 102 and projection optics 104 in further detail, in accordance with one embodiment. As illustrated, for the embodiment, light source 102 may include light emitting devices 202R, 202G and 202B, which may be red, green and blue light emitting diodes (LED) respectively, for emitting light in various primary colors, e.g. red, green and blue, when driven (i.e., when currents are applied).

Projection optics 104 may include a dichroic combiner 204, light integrator 206, mirror 208 and micro-mirror device 210, optically coupled to each other and to light emitting devices 202R, 202G and 202B as shown. Micro-mirror device 210 may include in particular a number of micro-mirrors.

As described earlier, light emitting devices 202R, 202G and 202B, and micro-mirror device 210 are electrically coupled to, and controlled by controller 106, to control the colors of the various pixels of an image frame being rendered, during operation.

Thus, except for the manner controller 106 advantageously controls the operation of light emitting devices of light source 102 and a light valve of projections optics 104, projection system 100 represents a broad range of projection systems. In particular, in alternate embodiments, in lieu of light emitting diodes 202R, 202G and 202B, and micro-mirror device 210, light source 102 and projection optics 104 may be provided with light emitting devices and light valves of other types respectively, to facilitate control of the colors of the various pixels of an image frame being rendered.

FIGS. 3a-3d illustrate various schemes controller 106 may drive the light emitting devices of light source 102, in accordance with various embodiments. For the illustrated embodiments, each of the light emitting devices is assumed to have a drive current design point ($H_{DC}$) 306b selected to allow the device to have a reasonable chance of having a reasonably lengthy operational life. Further, controller 106 successively drives the light emitting devices in successive sub-periods 302a-302c/302d of a frame period 302.

Figure 3A:
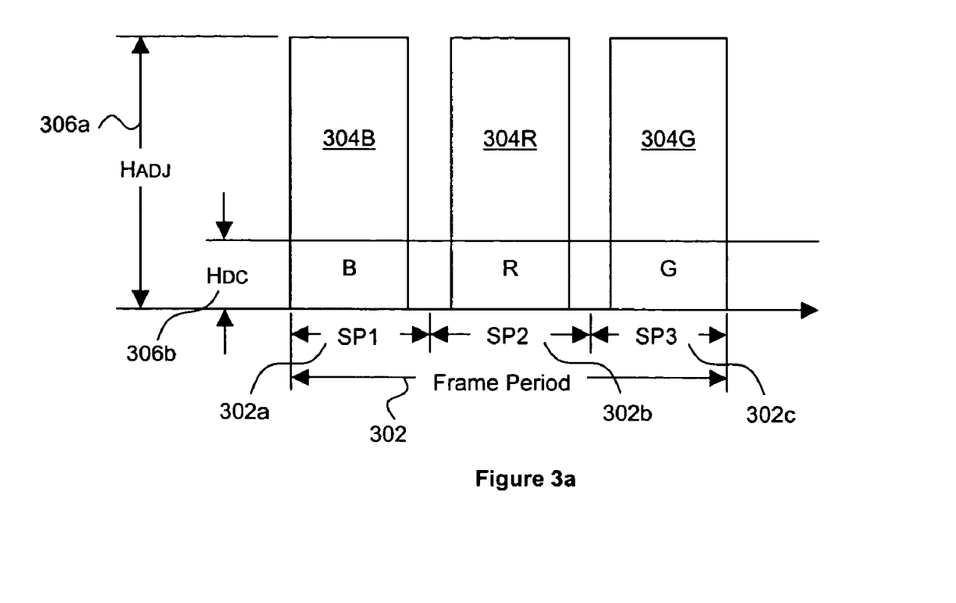
FIGS. 3a-3d illustrate various schemes for driving the light emitting devices of the light source of FIG. 1, in accordance with various embodiments.

As illustrated in FIG. 3a, in a first embodiment, controller 106 causes a drive circuit (not shown) to apply (hereinafter, simply "applies") a level of current ($H_{adj}$) during sub-period 1 (sp1) 302a of frame period 302 to drive (304B) a light emitting device to emit the primary blue color. Similarly, controller 106 "applies" a level of current ($H_{adj}$) during sub-period 2 (sp2) 302b and sub-period 3 (sp3) 302c of frame period 302 to drive (304R and 304G) two other light emitting devices to emit the primary red color and the primary green color respectively.

For enhancing the likelihood of the light emitting devices having their designed/expected operational life, current level $H_{adj}$ is the drive current design point $H_{DC}$ adjusted in view of the size of each of the sub-periods (sp1-sp3, 302a-302c) relative to the size of frame period 302. More specifically, for the embodiment, since each of the sub-periods (sp1-sp3, 302a-302c) is about ⅓ the size of frame period 302, current level $H_{adj}$ is about 3 times that of $H_{DC}$. In alternate embodiments, depending on the desired tradeoff between brightness and LED lifetime, $H_{adj}$ may be somewhat higher or lower than 3 times that of $H_{DC}$.

For ease of understanding, the embodiment of FIG. 3a has been described with each of the light emitting devices as having the same drive current design point $H_{DC}$, and each of the sub-periods (sp1-sp3, 302a-302c) as having the same size. In alternate embodiments, the drive current design point of each of the light emitting devices, and/or the size of each of the sub-periods may be different. Regardless, in each case, the applied current, for the embodiment, is the drive current design point adjusted in view of the size of the particular sub-period relative to the size of the frame period and the specific properties of the LED.

Figure 3B:
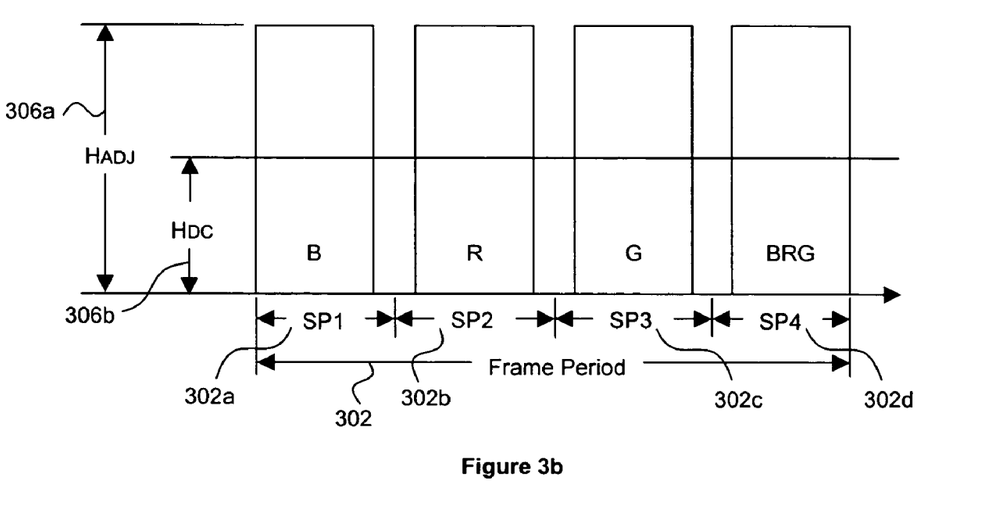

FIG. 3b illustrates another scheme for driving the light emitting devices of light source 102, in accordance with another embodiment. The embodiment in FIG. 3b is similar to the embodiment of FIG. 3a, except, for a frame period 302, controller 106, in addition to successively driving the light emitting devices to emit the primary colors in 3 sub-periods 302a-302c, applies current to drive all light emitting devices at the same time in a fourth sub-period 302d to provide white light. Thus, the embodiment advantageously enables projection system 100 to provide improved peak white for an image frame.

In various embodiments, the additional sub-period 302d is included only when the content of the image frame has a need for peak white illumination. Further, in various embodiments, the applied current is the drive current design point adjusted in view of the size of two of the sub-periods 302a-302d relative to the size of the frame period 302. In other words, $H_{adj}$ is about 2 times of $H_{DC}$ (since two of the sub-periods 302a-302d is about one-half of the frame period 302).

Figure 3C:
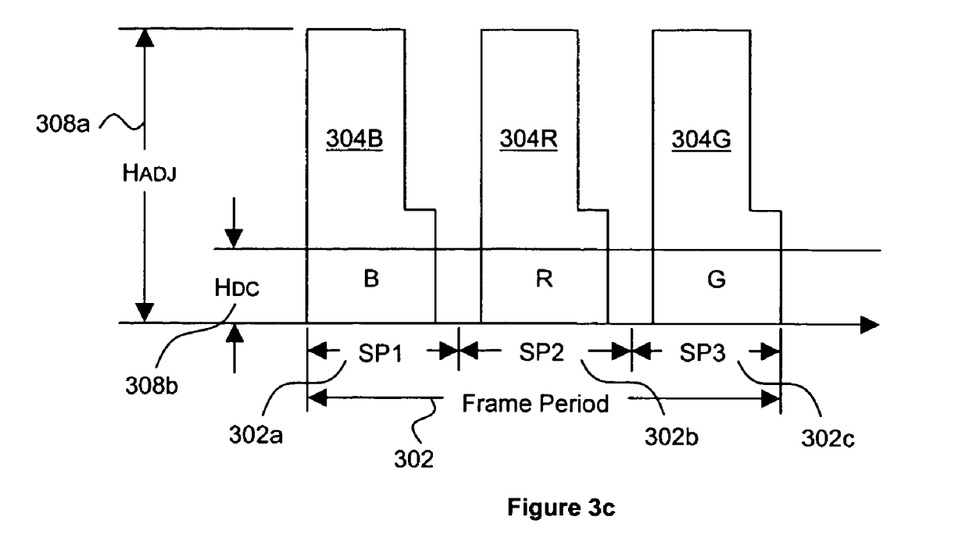
Figure 3D:
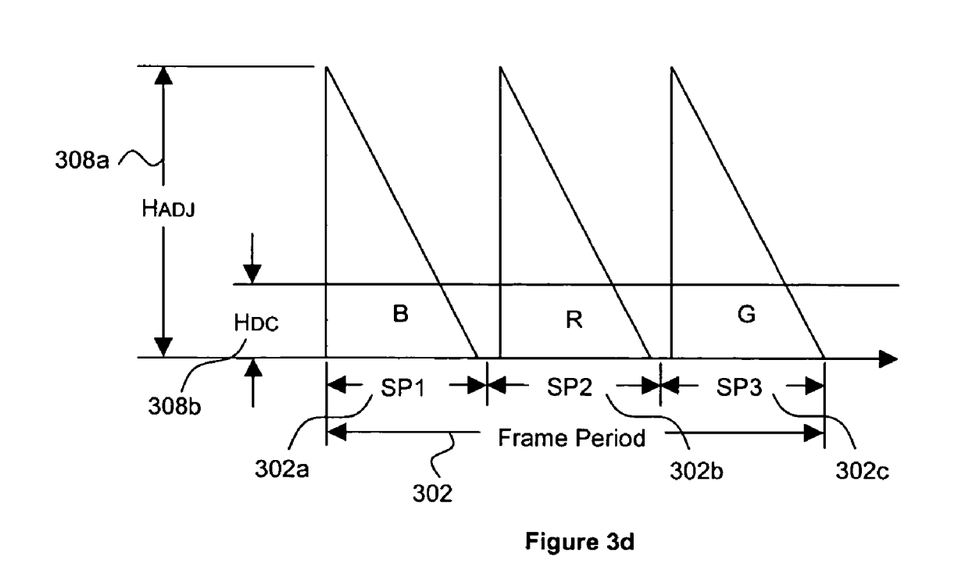

FIGS. 3c-3d illustrate yet two other schemes to drive the light emitting devices of light source 102, in accordance with two embodiments. The embodiments of FIG. 3c and FIG. 3d are similar to the embodiment of FIG. 3a, except, controller 106, in lieu of applying current to the light emitting devices at a constant rate, applies current in a variable manner during a sub-period. For the embodiment of FIG. 3c, the variable application of current has the form factor of a step function (with one step), whereas for the embodiment of FIG. 3d, the variable application of current has the form factor of varying linearly over time. In alternate embodiments, the variable application of current may have a form factor of a step function with two or more steps, a sawtooth function with a number of sawtooth, or other functions that vary linearly or non-linearly.

Figure 3E:
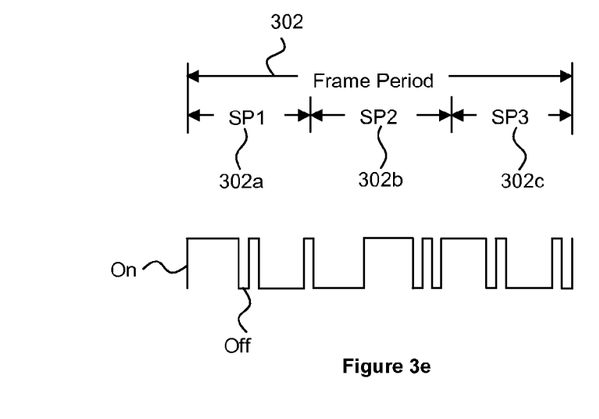
FIG. 3e illustrates an example complementary control of a light valve, in accordance with one embodiment.

By controlling the light valve of projection optics 104, such as micro-mirrors of a micro-mirror device, in a complementary manner (see e.g. FIG. 3e), increased granularity of gray levels may be obtained. [Note that the "on"/"off" durations are application dependent.] In this mode of operation, binary weighted pulse width modulation of digital (on-off) light valve pixels is not required. Rather, the light valve of a pixel is held in the "on" state for the length of time required to achieve the desired pixel brightness. The pixel brightness is the time integral of the pixel brightness from the time the light valve of the pixel is turned on to the time the light valve of the pixel is turned off. By not requiring binary weighted pulse width modulation to achieve grayscale, motion artifacts may be reduced. This mode of operation is likely to reduce the cost of the drive electronics since compute processing requirements are likely to be much less than that required for standard binary pulse width modulation drive schemes. A non-linear current drive scheme, (e.g. exponentially increasing current over time) would likely to be better than a linear drive to reproduce low level grayscale images accurately. However, compute requirements would likely increase and the peak drive current for the LED would also likely increase. So, in various implementations, an appropriate trade-off between grayscale accuracy, brightness and LED lifetime may be selected.

In various embodiments, the average applied current during each sub-period is the drive current design point adjusted in view of the average power applied to the light source over the frame period. In other words, average $H_{adj}$ is about 3 times of $H_{DC}$ in the case of square wave current pulse at ⅓ duty cycle.

In other embodiments, each of the embodiments of FIGS. 3c and 3d may also be practiced in combination with the embodiment of FIG. 3b.

Figure 4:
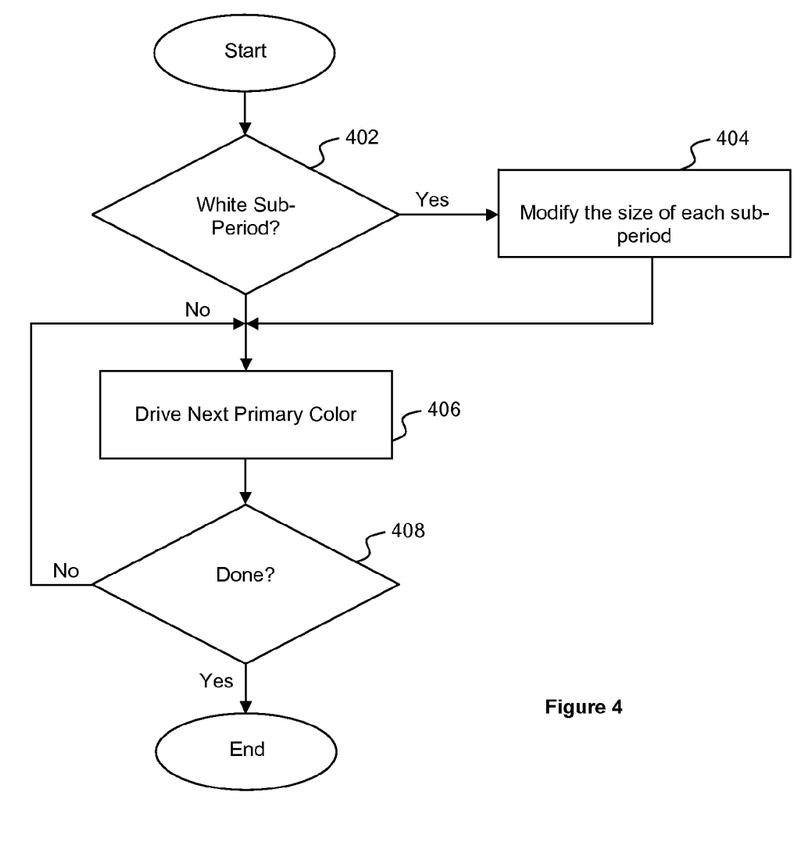
FIG. 4 illustrates a portion of the operational flow of the controller of FIG. 1 in further details, in accordance with one embodiment.

FIG. 4 illustrates a portion of the operational logic of controller 106, in accordance with one embodiment. In various embodiments, controller 106 may be implemented employing a general purpose controller or an application specific integrated circuit (ASIC) with the logic being implemented in firmware. In yet other embodiments, the logic may be implemented via combinatorial circuits.

Regardless, the portion of operational logic begins with controller 106 determining whether the image frame should be rendered with a standard 3 sub-period frame period, or a frame period with a white sub-period, block 402.

In various embodiments, controller 106 may make the determination based on whether the video signal includes a request for the peak white period for a frame. In other environments, controller 106 with sufficient computing resources may analyze a frame in real time to determine whether a peak white period should be provided.

If it is determined that the image frame is to be rendered with a standard 3 sub-period frame period, controller 106 proceeds to the operations of blocks 406-408. However, if it is determined that the image frame is to be rendered with a frame period with a white sub-period, controller 106 dynamically modifies the size of each sub-period, block 404, before proceeding to perform the operations of blocks 406-408.

At blocks 406-408, controller 106 causes the appropriate level of current (e.g. the earlier described design point adjusted level) to be successively applied to the light emitting devices of light source 102 to cause the primary colors of blue, red and green, and if applicable, white, to be emitted. Concurrently, in various embodiments, controller 106 may also turns a light valve, such as micro-mirrors of a micromirror device, of projection optics 104, on and off, as appropriate, to provide the desired gray scale.

Thus, it can be seen from the above description, methods for driving light emitting devices of a light source of a projection system, and projection systems so equipped have been described. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. In a projection apparatus, a method of operation comprising:
   receiving a signal of one or more frames of visual images;
   dynamically selecting a size of a first portion of a frame period; and
   applying a first substantially constant level of current to drive a first light emitting device of a light source for the first portion of the frame period to cause the first light emitting device to emit light of a first color during the first portion of the frame period to render a frame of the visual images, the first light emitting device having an operational life characteristic that is dependent at least in part on drive current employed to drive the first light emitting device, and the first substantially constant level of current applied being selected in view of at least the first light emitting device's operational life characteristic dependency on drive current and the size of the first portion of the frame period relative to the size of the entire frame period.

2. The method of claim 1, wherein the first color is a selected one of a red primary color, a blue primary color and a green primary color.

3. The method of claim 1, wherein the size of the first portion of the frame period is about 1/n of the entire frame period, and the first substantially constant level of current applied is substantially inversely proportional to 1/n, where n is a positive integer.

4. The method of claim 1, wherein the method further comprises applying a second substantially constant level of current to drive a second light emitting device of the light source for a second portion of the frame period to cause the second light emitting device to emit light of a second color during the second portion of the frame period to render the same frame of the visual images, the second light emitting device having an operational life characteristic that is dependent on drive current employed to drive the second light emitting device, and the second substantial constant level being selected in view of at least the second light emitting device's operational life characteristic dependency on drive current and the size of the second portion of the frame period relative to the size of the entire frame period.

5. The method of claim 4, wherein the first color is a selected one of a red primary color, a blue primary color and a green primary color; and the second color is a selected one of the unselected primary colors.

6. The method of claim 4, wherein the method further comprises applying the first and second substantially constant levels of current to drive the first and second light emitting devices of the light source respectively for a third portion of the frame period to cause the first and second light emitting devices to emit light of the first and second colors respectively during the third portion of the frame period to render the image frame.

7. The method of claim 6, wherein the size of the first and third portion combined is about 1/n of the frame period, and the first substantially constant level of current applied is substantially inversely proportional to 1/n, where n is a positive integer.

8. The method of claim 6, wherein the size of the second and third portion combined is about 1/n of the frame period, and the second substantially constant level of current applied is substantially inversely proportional to 1/n, where n is a positive integer.

9. The method of claim 6, wherein said applying of the first and second substantially constant levels of current to drive the first and second light emitting devices of the light source respectively for a third portion of the frame period is conditionally performed based at least in part on the content of the frame of the visual images being rendered.

10. The method of claim 9, wherein the method further comprises dynamically selecting the sizes of said second and third portions.

11. A projection apparatus comprising:
   projection optics;
   a light source optically coupled to the projection optics to emit light for the projection optics; and
   a controller electrically coupled to the light source to control emission of light by the light source, including, dynamically selecting the size of a first portion of a frame period, application of a first substantially constant level of current to drive a first light emitting device of the light source for the first portion of the frame period to cause the first light emitting device to emit light of a first color during the first portion of the frame period to render an image frame, the first light emitting device having an operational life characteristic that is dependent on drive current applied to drive the first light emitting device, and the first substantially constant level of current applied being selected in view of at least the operational life characteristic dependency on drive current and the size of the first portion of the frame period relative to the size of the entire frame period.

12. The projection apparatus of claim 11, wherein the controller is further coupled to the light source to apply a second substantially constant level of current to drive a second light emitting device of the light source for a second portion of the frame period to cause the second light emitting device to emit light of a second color during the second portion of the frame period to render the same frame of the visual images, the second light emitting device having an operational life characteristic that is dependent on drive current applied to drive the second light emitting device, and the second substantial constant level being selected in view of at least the operational life characteristic dependency on the drive current and the size of the second portion of the frame period relative to the size of the entire frame period.

13. The projection apparatus of claim 12, wherein the controller is further coupled to the light source to apply the first and second substantially constant levels of current to drive the first and second light emitting devices of the light source respectively for a third portion of the frame period to cause the first and second light emitting devices to emit light of the first and second colors respectively during the third portion of the frame period to render the image frame.

14. The projection apparatus of claim 13, wherein the controller is further equipped to perform said application of the first and second substantially constant levels of current to drive the first and second light emitting devices of the light source respectively for a third portion of the frame period conditionally, based at least in part on the content of the image frame being rendered.

15. The projection apparatus of claim 14, wherein the controller is further equipped to dynamically select the sizes of said second and third portions.

16. In a projection apparatus, a method of operation comprising:
receiving a signal of one or more frames of visual images; and
applying a first variable level of current to drive a first light emitting device of a light source for a first portion of a frame period to cause the first light emitting device to emit light of a first color during the first portion of the frame period to render a frame of the visual images, the first light emitting device having an operational life characteristic that is dependent at least in part on drive current employed to drive the first light emitting device, and a time average of the first variable current applied being selected in view of at least the first light emitting device's operational life characteristic dependency on drive current and the size of the first portion of the frame period relative to the size of the entire frame period, wherein the first variable level of current applied during the first portion of the frame period varies non-linearly or has a form factor selected from a function group consisting of a step funtion having one or more steps, and a sawtooth funtion having a plurality of sawtooths.

17. The method of claim 16, wherein the method further comprises selectively turning on and off of a light valve one or more times during the first portion of the frame period.

18. The method of claim 17, wherein said selectively turning on and off of a light valve comprises selectively turning on and off one or more micro-mirrors of a micro-mirror device one or more times during the first portion of the frame period.

19. A projection apparatus comprising:
projection optics;
a light source optically coupled to the projection optics to emit light for the projection optics; and
a controller electrically coupled to the light source to control emission of light by the light source, including application of a first variable level of current to drive a first light emitting device of the light source for a first portion of a frame period to cause the first light emitting device to emit light of a first color during the first portion of the frame period to render an image frame, the first light emitting device having an operational life characteristic that is dependent on drive current applied to drive the first light emitting device, and the time average of the first variable level current being selected in view of at least the operational life characteristic dependency on drive current and the size of the first portion of the frame period relative to the size of the entire frame period, wherein the first variable level of current applied during the first portion of the frame period varies non-linearly or has a form factor selected from a funtion group consisting of a step funtion having one or more steps, and a sawtooth funtion having a plurality of sawtooths.

20. The projector apparatus of claim 19, wherein the projection optics comprise a light valve, and the controller is further electrically coupled to the light valve as well as equipped to selectively turn on and off of the light valve one or more times during the first portion of the frame period.

21. The projector apparatus of claim 20, wherein said light valve comprises a micro-mirror device, and said the controller is equipped to selectively turn on and off one or more micro-mirrors of the micro-mirror device one or more times during the first portion of the frame period.

22. In a projection apparatus, a method of operation comprising:
receiving a signal of one or more frames of visual images; and
applying a first level of current to drive a first light emitting device of a light source for a first portion of a frame period to cause the first light emitting device to emit light of a first color during the first portion of the frame period to render a frame of the visual images, a size of the first portion of the frame period being selected in view of at least a content of the one or more frames of visual images.

23. The method of claim 22, wherein the first light emitting device has an operational life characteristic that is dependent at least in part on drive current employed to drive the first light emitting device, and the first level of current applied is selected in view of at least the first light emitting device's operational life characteristic dependency on drive current and the size of the first portion of the frame period relative to the size of the entire frame period.

24. The method of claim 22, wherein the method further comprises determining that a peak white illumination is desired in view of at least the content of one or more frames of visual images.

25. The method of claim 22, wherein the method further comprises dynamically selecting the size of said first portion.

26. The method of claim 22, wherein the first level of current is substantially constant.

27. The method of claim 22, wherein the first level of current is variable.

* * * * *

UNITED STATES PATENT AND TRADEMARK OFFICE
CERTIFICATE OF CORRECTION

PATENT NO.         : 7,408,527 B2
APPLICATION NO.    : 10/835672
DATED              : August 5, 2008
INVENTOR(S)        : David Elliot Slobodin It is certified that error appears in the above-identified patent and that said Letters Patent is hereby corrected as shown below:

Col. 6, line 67-Col. 7, line 1 "...including, dynamically"..." should read --...including dynamically...--;

Col. 8, lines 1-2, "...step funtion...sawtooth funtion..." should read --...step function...sawtooth function...--;

Col. 8, lines 30-32, "...funtion group... step funtion..., ...sawtooth funtion,..." should read --...function group... step function..., ...sawtooth function...--.

Col. 8, lines 33 & 38, "...The projector apparatus..." should read --...The projection apparatus...--.

Signed and Sealed this

Seventeenth Day of March, 2009

JOHN DOLL
*Acting Director of the United States Patent and Trademark Office*